(12) United States Patent
Nakagawa et al.

(10) Patent No.: US 10,777,848 B2
(45) Date of Patent: Sep. 15, 2020

(54) LITHIUM ION SECONDARY BATTERY

(71) Applicant: Envision AESC Japan Ltd., Zama-Shi, Kanagawa (JP)

(72) Inventors: Takashi Nakagawa, Zama (JP); Sayaka Yonehara, Zama (JP)

(73) Assignee: Envision AESC Japan Ltd., Zama-Shi (JP)

( * ) Notice: Subject to any disclaimer, the term of this patent is extended or adjusted under 35 U.S.C. 154(b) by 0 days.

(21) Appl. No.: 15/171,696

(22) Filed: Jun. 2, 2016

(65) Prior Publication Data

US 2017/0005369 A1  Jan. 5, 2017

(30) Foreign Application Priority Data

Jun. 30, 2015 (JP) ................................. 2015-131993

(51) Int. Cl.
*H01M 10/0567* (2010.01)
*H01M 4/505* (2010.01)
(Continued)

(52) U.S. Cl.
CPC ....... *H01M 10/0567* (2013.01); *H01M 2/166* (2013.01); *H01M 4/131* (2013.01);
(Continued)

(58) Field of Classification Search
None
See application file for complete search history.

(56) References Cited

U.S. PATENT DOCUMENTS

2002/0164479 A1* 11/2002 Matsubara ............ H01M 4/362 428/367
2004/0137327 A1* 7/2004 Gross .................... B22F 1/0003 429/231.8

(Continued)

FOREIGN PATENT DOCUMENTS

CN 102709602 A 10/2012
EP 2535976 A1 12/2012
(Continued)

OTHER PUBLICATIONS evidentiary references (Chemical book—http://www.chemicalbook.com/ChemicalProductProperty_EN_CB62515919, ChemBK—http://www.chembk.com/en/chem/Fluoroethylene%20Carbonate and Sigma-Aldrich—http://www.sigmaaldrich.com/catalog/product/aldrich/v2607?lang=en&region=US).*

(Continued)

*Primary Examiner* — Wojciech Haske
(74) *Attorney, Agent, or Firm* — Troutman Pepper Hamilton Sanders LLP

(57) ABSTRACT

Provided is a lithium ion secondary battery including: a positive electrode; a negative electrode; a separator; and an electrolyte solution, the electrolyte solution including an additive A containing sulfur, and at least one of a cyclic carbonate additive B which is different from the additive A and which has an unsaturated bond and a cyclic carbonate additive C which is different from the additives A and B and which has a halogen. A molar ratio of the additive A relative to a total molar amount of the additive A, the additive B, and the additive C is smaller than a total of a molar ratio of the additive B and a molar ratio of the additive C relative to the total molar amount.

15 Claims, 1 Drawing Sheet

(51) Int. Cl.
| | |
|---|---|
| *H01M 4/525* | (2010.01) |
| *H01M 10/0525* | (2010.01) |
| *H01M 10/42* | (2006.01) |
| *H01M 2/16* | (2006.01) |
| *H01M 4/131* | (2010.01) |
| *H01M 4/133* | (2010.01) |
| *H01M 4/587* | (2010.01) |
| *H01M 4/62* | (2006.01) |
| *H01M 4/66* | (2006.01) |
| *H01M 10/0568* | (2010.01) |
| *H01M 10/0569* | (2010.01) |
| *H01M 10/0585* | (2010.01) |
| *H01M 10/04* | (2006.01) |
| *H01M 4/04* | (2006.01) |
| *H01M 4/1391* | (2010.01) |
| *H01M 4/1393* | (2010.01) |
| *H01M 10/44* | (2006.01) |
| *H01M 4/02* | (2006.01) |

(52) U.S. Cl.
CPC .......... *H01M 4/133* (2013.01); *H01M 4/505* (2013.01); *H01M 4/525* (2013.01); *H01M 4/587* (2013.01); *H01M 4/622* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 10/0585* (2013.01); *H01M 10/4235* (2013.01); *H01M 4/043* (2013.01); *H01M 4/0404* (2013.01); *H01M 4/0471* (2013.01); *H01M 4/1391* (2013.01); *H01M 4/1393* (2013.01); *H01M 10/0413* (2013.01); *H01M 10/446* (2013.01); *H01M 2004/021* (2013.01); *H01M 2004/027* (2013.01); *H01M 2004/028* (2013.01); *H01M 2220/20* (2013.01); *H01M 2300/004* (2013.01); *H01M 2300/0025* (2013.01)

(56) References Cited

U.S. PATENT DOCUMENTS

| | | | |
|---|---|---|---|
| 2006/0292452 A1* | 12/2006 | Utsugi | C07C 309/07 429/340 |
| 2009/0098450 A1* | 4/2009 | Kikuchi | B32B 27/32 429/145 |
| 2012/0308881 A1 | 12/2012 | Tokuda et al. | |
| 2013/0130115 A1* | 5/2013 | Park | H01M 4/133 429/231.8 |
| 2013/0280622 A1 | 10/2013 | Tokuda et al. | |
| 2013/0330598 A1 | 12/2013 | Shim et al. | |
| 2014/0308565 A1 | 10/2014 | Lee et al. | |
| 2015/0079463 A1* | 3/2015 | Yamamoto | H01M 4/505 429/188 |
| 2015/0303521 A1 | 10/2015 | Sasaki et al. | |
| 2016/0099481 A1 | 4/2016 | Akagawa et al. | |

FOREIGN PATENT DOCUMENTS

| | | | |
|---|---|---|---|
| EP | 2683015 A1 | 1/2014 | |
| JP | 2012094454 A | 5/2012 | |
| JP | 2015-069702 A | 4/2015 | |
| WO | WO-2013161445 A1 * | 10/2013 | ............ H01M 4/505 |
| WO | 2014/080871 A1 | 5/2014 | |
| WO | 2014/189082 A1 | 11/2014 | |
| WO | 2016/103509 A1 | 6/2016 | |
| WO | 2016/103511 A1 | 6/2016 | |

OTHER PUBLICATIONS

Extended European Search Report dated Aug. 11, 2016 for the corresponding European Patent Application No. 16173432.2.
Communication pursuant to Article 94(3) EPC for the corresponding European Patent Application No. 16173432.2 dated Mar. 5, 2018.
Liu Shuang et al: "Long cycle life lithium ion battery with lithium nickel cobalt manganese oxide (NCM) cathode", Journal of Power Sources, vol. 261, pp. 285-291, XP028652910, ISSN: 0378-7753, DOI: 10.1016/j.jpowsour.2014.03.083.

\* cited by examiner

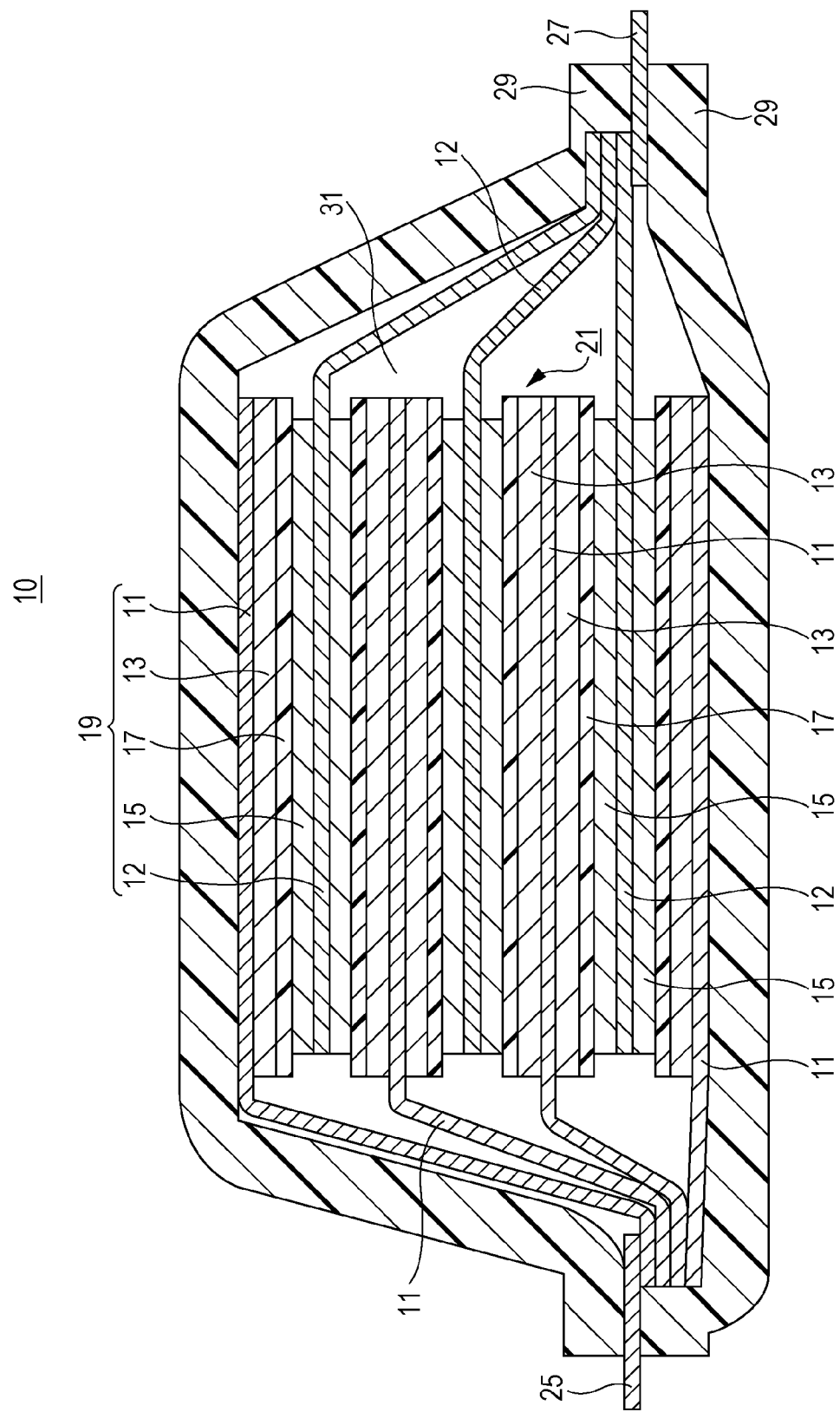

LITHIUM ION SECONDARY BATTERY

CROSS-REFERENCE TO RELATED APPLICATION

This application claims priority from Japanese Patent Application No. 2015-131993 filed with the Japan Patent Office on Jun. 30, 2015, the entire content of which is hereby incorporated by reference.

BACKGROUND

1. Technical Field

The present disclosure relates to nonaqueous electrolyte batteries, particularly to lithium ion secondary batteries.

2. Related Art

Nonaqueous electrolyte batteries have been put into practical use as batteries for vehicles including hybrid vehicles and electric vehicles. Lithium ion secondary batteries have been used as such on-vehicle batteries. Lithium ion secondary batteries have been required to have various characteristics: output characteristic, energy density, capacity, lifetime, and high-temperature stability. In particular, various improvements for the electrolyte solution have been attempted in order to enhance the battery life (i.e., cycle characteristic).

For example, JP-A-2012-94454 has disclosed that cyclic disulfonate is added to the electrolyte solution in order to improve the rate characteristic after the battery is preserved under high temperature. In the example disclosed in JP-A-2012-94454, a lithium manganese aluminum composite oxide is used for the positive electrode active material and the nonaqueous electrolyte solution including added dimethylene methanedisulfonate is used.

It has been known that the cyclic disulfonate is decomposed on the surface of the electrode (especially, negative electrode) to form a film. The formed film allows the battery to have a higher cycle characteristic. In particular, it has been known that the methylene methanedisulfonate (hereinafter referred to as "MMDS") is highly effective in protecting the negative electrode.

SUMMARY

A lithium ion secondary battery according to an embodiment of the present disclosure includes: a positive electrode; a negative electrode; a separator; and an electrolyte solution, the electrolyte solution including an additive A containing sulfur, and at least one of a cyclic carbonate additive B which is different from the additive A and which has an unsaturated bond and a cyclic carbonate additive C which is different from the additives A and B and which has a halogen. A molar ratio of the additive A relative to a total molar amount of the additive A, the additive B, and the additive C is smaller than a total of a molar ratio of the additive B and a molar ratio of the additive C relative to the total molar amount.

BRIEF DESCRIPTION OF THE DRAWING

The drawing is a schematic sectional view illustrating a lithium ion secondary battery according to one embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Under the high-temperature environment, using MMDS and the positive electrode active material containing nickel, specifically a lithium nickel composite oxide, in combination may cause MMDS to attack the lithium nickel composite oxide to deteriorate the positive electrode. In view of this, an objective of the present disclosure is to provide a lithium ion secondary battery including a lithium nickel composite oxide as the positive electrode active material and having an extended cycle lifetime (high discharge capacity retention) even in the use under the high temperature because of the effects from the suppressed deterioration of the positive electrode and the formation of the film on the negative electrode.

A lithium ion secondary battery according to an embodiment of the present disclosure includes: a positive electrode; a negative electrode; a separator; and an electrolyte solution, the electrolyte solution including an additive A containing sulfur, and at least one of a cyclic carbonate additive B which is different from the additive A and which has an unsaturated bond and a cyclic carbonate additive C which is different from the additives A and B and which has a halogen. A molar ratio of the additive A relative to a total molar amount of the additive A, the additive B, and the additive C is smaller than a total of a molar ratio of the additive B and a molar ratio of the additive C relative to the total molar amount.

In the lithium ion secondary battery according to the present disclosure, a protective film is suitably formed by an additive contained in the electrolyte solution on a surface of the negative electrode. The additive contained in the electrolyte solution hardly attacks the lithium nickel composite oxide positive electrode under high temperature. Because of this, the deterioration of the positive electrode is prevented. Thus, the cycle characteristic of the lithium ion secondary battery according to the present disclosure under the high temperature is improved.

An embodiment of the present disclosure will be described below. A positive electrode in this embodiment is a battery member with a shape like a thin plate or a sheet. This member includes a positive electrode active material layer formed by applying or rolling a mixture, which includes a positive electrode active material, binder, and if necessary a conductive agent, on a positive electrode current collector such as a metal foil and then drying the mixture. A negative electrode in this embodiment is a battery member with a shape like a thin plate or a sheet. This member includes a negative electrode active material layer formed by applying a mixture, which includes a negative electrode active material, binder, and if necessary a conductive agent, on a negative electrode current collector. The separator is a film-shaped battery member. This member separates between the positive electrode and the negative electrode to secure the conduction of lithium ions between the positive electrode and the negative electrode. The electrolyte solution is an electrically conductive solution obtained by dissolving an ionic substance in a solvent. In this embodiment, particularly a nonaqueous electrolyte solution can be used. The power generation element including the positive electrode, the negative electrode, and the separator constitutes one unit of the battery main components. In general, this power generation element is a stack having the positive electrode and the negative electrode overlapped (stacked) on each other with the separator interposed therebetween. In the lithium ion secondary battery according to the embodiment of the present disclosure, this stack is immersed in the electrolyte solution.

The lithium ion secondary battery according to the embodiment includes the package and the power generation element housed inside the package. Preferably, the power generation element is housed inside the sealed package. Here, "sealed" refers to the state that the power generation element is covered with the package material so that the power generation element is not exposed to the external air. That is to say, the package has a sealable bag-like shape that can house the power generation element inside.

Here, the electrolyte solution includes an additive A containing sulfur, and at least one of a cyclic carbonate additive B which is different from the additive A and which has an unsaturated bond and a cyclic carbonate additive C which is different from the additives A and B and which has a halogen. A molar ratio of the additive A relative to a total molar amount of the additive A, the additive B, and the additive C is smaller than a total of a molar ratio of the additive B and a molar ratio of the additive C relative to the total molar amount. As long as the electrolyte solution contains the additives with such a molar ratio, the performance of the additives for forming the film for the negative electrode will not deteriorate. Thus, the deterioration of the positive electrode can be prevented and the cycle characteristic of the battery is improved.

First, an electrolyte solution to be used in the present embodiment will be described. A preferred example of the electrolyte solution, which can be used in any embodiment, is a nonaqueous electrolyte solution, and example thereof is a mixture including a linear carbonate and a cyclic carbonate. Examples of the linear carbonate include dimethyl carbonate (hereinafter referred to as "DMC"), diethyl carbonate (hereinafter referred to as "DEC"), di-n-propyl carbonate, di-i-propyl carbonate, di-n-butyl carbonate, di-isobutyl carbonate, and di-t-butyl carbonate. Examples of the cyclic carbonate include propylene carbonate (hereinafter referred to as "PC") and ethylene carbonate (hereinafter referred to as "EC"). The electrolyte solution is obtained by dissolving a lithium salt such as lithium hexafluorophosphate ($LiPF_6$), lithium tetrafluoroborate ($LiBF_4$), or lithium perchlorate ($LiClO_4$) in such a carbonate mixture.

The electrolyte solution may contain additives in addition to the above components. The additives to be added to the electrolyte solution in this embodiment are classified into three kinds according to their functions: the additive A containing sulfur; the cyclic carbonate additive B, which is different from the additive A and which has an unsaturated bond; and the cyclic carbonate additive C, which is different from both the additives A and B and which has a halogen. The additive A containing sulfur is decomposed electrochemically in the process of charging and discharging the battery to form a film on a surface of the electrode used in the embodiments to be described below. This stabilizes the structure of the electrode. Examples of such an additive include cyclic sulfonates including sultones and cyclic disulfonates such as methylene methanedisulfonate (MMDS), ethylene methanedisulfonate, and propylene methanedisulfonate, and linear sulfonate such as methylenebis(benzenesulfonate), methylenebis(phenylmethanesulfonate), and methylenebis(ethanesulfonate).

Like the additive A, the cyclic carbonate additive B, which is different from the additive A and which has an unsaturated bond, forms a protective film for the positive electrode and the negative electrode in the process of charging and discharging the battery. In particular, the additive B can prevent the additive A from attacking the positive electrode active material containing a lithium nickel composite oxide. Examples of the additive B include vinylene carbonate, vinylethylene carbonate, propylene carbonate methacrylate, and propylene carbonate acrylate. A particularly preferable example of the additive B is vinylene carbonate (hereinafter referred to as "VC").

The cyclic carbonate additive C which is different from the additives A and B and which has a halogen forms a protective film for the positive electrode and the negative electrode in the process of charging and discharging the battery, which is similar to the additive A. The additive C can also prevent the additive A from attacking the positive electrode active material containing lithium nickel composite oxide. Examples of the additive C include fluoroethylene carbonate, difluoroethylene carbonate, trifluoroethylene carbonate, chloroethylene carbonate, dichloroethylene carbonate, and trichloroethylene carbonate. A particularly preferable example of the additive C is fluoroethylene carbonate (hereinafter referred to as "FEC").

In the preparation of the electrolyte solution, the additive is added by 20 wt % or less, preferably 15 wt % or less, and more preferably 10 wt % or less relative to the weight of the entire electrolyte solution. By mixing the electrolyte solution components in predetermined amounts, the nonaqueous electrolyte solution is prepared. With the additives, the positive electrode, the negative electrode, the separator, and the package, the battery is assembled. After that, a predetermined operation including the charging and discharging is performed, so that the battery is finished to be ready for the shipment (pre-shipment state). In the process of charging and discharging the battery, the additive is decomposed through the electrochemical reaction or other chemical reaction and is consumed to form the film on the surface of the electrode. Thus, the amount of each additive in the electrolyte solution is reduced. When the battery is finished to be in the pre-shipment state, it is particularly preferable that the molar ratio of the additive A relative to the total molar amount of the additive A, the additive B, and the additive C is smaller than the total of the molar ratio of the additive B and the molar ratio of the additive C relative to the total molar amount. It is desirable that the cyclic carbonate additive A containing sulfur is fully consumed in the process of charging and discharging to form the film on the electrode surface, resulting in that the additive A hardly remains in the electrolyte solution.

The molar ratio of the additive A relative to the total molar amount of the additive A, the additive B, and the additive C is preferably 50 mol % or less. That is to say, the amount of the additive A is not more than a half of the total molar amount of the additives. Only one of the additives B and C may be added or both the additives B and C may be added. If both the additives B and C are added together, the molar ratio therebetween may be approximately in the range of 1:10 to 10:1. In the embodiment, it is particularly preferable to use the electrolyte solution containing all the additives A, B, and C. Using the additives according to the embodiment makes the weight of sulfur existing in the negative electrode larger than the weight of sulfur existing in the positive electrode, which is very preferable.

The negative electrode that can be used in any embodiment includes a negative electrode active material layer including a negative electrode active material disposed on a negative electrode current collector. Preferably, the negative electrode includes the negative electrode active material layer obtained by applying or rolling a mixture, which includes the negative electrode active material, binder, and a conductive agent added as necessary, onto the negative electrode current collector including a metal foil such as a copper foil, and then drying the mixture. In each embodiment, the negative electrode active material preferably includes graphite particles and/or amorphous carbon particles. If a mixed carbon material including both graphite particles and amorphous carbon particles is used, the regeneration performance of the battery is improved.

Graphite is a hexagonal crystal carbon material having the hexagonal-plate-like crystal structure. Graphite is also called black lead or the like. The preferred shape of the graphite is particle. Amorphous carbon may have a structure partly similar to graphite. Amorphous carbon refers to a carbon material that is amorphous as a whole, having a microcrystalline structure forming a network randomly. Examples of the amorphous carbon include carbon black, cokes, activated carbon, carbon fiber, hard carbon, soft carbon, and mesoporous carbon. The preferred shape of the amorphous carbon is particle.

Examples of the conductive agent used as necessary for the negative electrode active material layer include carbon materials, for example, carbon fiber such as carbon nanofiber, carbon blacks such as acetylene black and Ketjen black, activated carbon, mesoporous carbon, fullerenes, and carbon nanotube. Additionally, the negative electrode active material layer may contain additives usually used for forming the electrode, such as thickener, dispersant, and stabilizer.

Examples of the binder used for the negative electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

The positive electrode that can be used in any embodiment includes a positive electrode active material layer including a positive electrode active material disposed on a positive electrode current collector. Preferably, the positive electrode includes the positive electrode active material layer obtained by applying or rolling a mixture, which includes the positive electrode active material, binder, and a conductive agent added as necessary, onto the positive electrode current collector including a metal foil such as an aluminum foil, and then drying the mixture. The positive electrode active material may be a lithium transition metal oxide. The lithium transition metal oxide is preferably a transition metal composite oxide represented by general formula $Li_xNi_yCo_zMe_{(1-y-z)}O_2$ (where Me is at least one kind of metal selected from the group consisting of Al, Mn, Na, Fe, Cr, Cu, Zn, Ca, K, Mg, and Pb). Examples of such a transition metal composite oxide include a lithium nickel oxide (such as $LiNiO_2$), a lithium cobalt oxide (such as $LiCoO_2$), a lithium manganese oxide (such as $LiMn_2O_4$), and a mixture including any of these. It is particularly preferable to use a lithium nickel cobalt manganese composite oxide represented by general formula $Li_xNi_yCo_zMn_{(1-y-z)}O_2$. In the formula, "x" is a numeral satisfying $1 \leq x \leq 1.2$, y and z are positive numerals satisfying $y+z<1$, and y is a numeral of 0.5 or less. Containing more manganese makes it difficult to synthesize a composite oxide with a single phase. In view of this, the relation $1-y-z \leq 0.4$ is desirably satisfied. Further, containing more cobalt results in cost increase and capacity decrease. In view of this, the relations of $z<y$ and $z<1-y-z$ are desirably satisfied. From the viewpoint of achieving the battery with higher capacity, it is particularly preferable that the relations of $y>1-y-z$ and $y>z$ are satisfied. The lithium nickel cobalt manganese composite oxide preferably has a layered crystal structure.

Examples of the conductive agent that may be used for the positive electrode active material layer include carbon materials, for example, carbon fiber such as carbon nanofiber, carbon blacks such as acetylene black and Ketjen black, activated carbon, graphite, mesoporous carbon, fullerenes, and carbon nanotube. In addition, the positive electrode active material layer may contain additives that are usually used for forming the electrode, such as thickener, dispersant, and stabilizer.

Examples of the binder used for the positive electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

The separator to be used in any embodiment includes an olefin resin layer. The olefin resin layer is a layer containing polyolefin obtained by polymerizing or co-polymerizing α-olefin. Examples of such α-olefin include ethylene, propylene, butene, pentene, and hexene. In the embodiment, the olefin resin layer is preferably a layer with a structure having pores closed when the battery temperature has increased, i.e., porous or microporous polyolefin. With the olefin resin layer having such a structure, the separator is closed (shutdown) upon the increase in battery temperature, thereby stopping the ion flow. In order to achieve the shutdown effect, it is particularly preferable to use the porous polyethylene film. The separator may include a heat-resistant microparticle layer. With the heat-resistant microparticle layer, the stop of the battery function by the heat generation from the battery can be suppressed. The heat-resistant microparticle layer includes a stable inorganic microparticle with heat resistance that resists a temperature of 150° C. or higher and uneasily reacts electrochemically. Examples of such a heat-resistant inorganic microparticle include inorganic oxide such as silica, alumina (α-alumina, β-alumina, and θ-alumina), iron oxide, titanium oxide, barium titanate, and zirconium oxide, and minerals such as boehmite, zeolite, apatite, kaolin, spinel, mica, and mullite. The separator including the heat-resistant resin layer is generally referred to as "ceramic separator".

Here, a structure example of the lithium ion secondary battery according to the embodiment is described with reference to the drawing. The drawing illustrates an example of a cross section of the lithium ion secondary battery. A lithium ion secondary battery 10 includes, as main components, a negative electrode current collector 11, a negative electrode active material layer 13, a separator 17, a positive electrode current collector 12, and a positive electrode active material layer 15. In the drawing, the negative electrode active material layer 13 is provided on each surface of the negative electrode current collector 11. The positive electrode active material layer 15 is provided on each surface of the positive electrode current collector 12. Note that the active material layer may alternatively be formed on only one surface of each current collector. The negative electrode current collector 11, the positive electrode current collector 12, the negative electrode active material layer 13, the positive electrode active material layer 15, and the separator 17 constitute one battery unit, i.e., a power generation element (unit cell 19 in the drawing). A plurality of unit cells 19 is stacked with the separator 17 interposed therebetween. Extension portions extending from the negative electrode current collectors 11 are collected and bonded onto a negative electrode lead 25. Extension portions extending from the positive electrode current collectors 12 are collected and bonded onto a positive electrode lead 27. The positive electrode lead is preferably an aluminum plate and the negative electrode lead is preferably a copper plate. In some cases, the positive electrode lead and the negative electrode lead may be partly coated with another metal (such as nickel, tin, or solder) or a polymer material. The positive electrode lead and the negative electrode lead are welded to the positive electrode and the negative electrode, respectively. The battery including the stacked unit cells is covered with a package 29 with the welded negative electrode lead 25 and positive electrode lead 27 led out of the battery. An electrolyte solution 31 is poured into the package 29. The package 29 has a shape obtained by heat-sealing the periphery of the two stacks.

EXAMPLES

Manufacture of Negative Electrode: Examples and Comparative Examples 3 to 10

Graphite powder with a BET specific surface area of 3.4 $m^2/g$ was used as the negative electrode active material. This graphite powder, carbon black powder (hereinafter referred to as "CB") with a BET specific surface area of 62 $m^2/g$ as the conductive agent, and carboxymethyl cellulose (hereinafter referred to as "CMC") and styrene butadiene copolymer latex (hereinafter referred to as "SBR") as the binder resin were mixed in a solid content mass ratio of CB:CMC:SBR=0.3:1.0:2.0. The resulting mixture was added to the ion-exchanged water and the mixture containing the ion-exchanged water was stirred. This provided a slurry having these materials uniformly dispersed in water. The slurry was applied onto a 10-μm-thick copper foil to serve as a negative electrode current collector. Next, the electrode was heated for 10 minutes at 125° C. to vaporize water. Thus, the negative electrode active material layer was formed. The negative electrode active material layer was pressed to manufacture the negative electrode having the negative electrode active material layer applied onto one surface of the negative electrode current collector.

Manufacture of Negative Electrode: Comparative Examples 1 and 2

The negative electrode was manufactured through the same procedure as the aforementioned procedure except that amorphous carbon powder (hard carbon) with a BET specific surface area of 4.5 $m^2/g$ was used as the negative electrode active material. This negative electrode was used as the battery in Comparative Example 1. Moreover, the negative electrode was manufactured through the same procedure as the aforementioned procedure except that graphite powder with a BET specific surface area of 4.5 $m^2/g$ was used as the negative electrode active material. This negative electrode was used as the battery in Comparative Example 2.

Manufacture of Positive Electrode: Examples and Comparative Examples 1 to 10

A mixed oxide was used as the positive electrode active material, and the mixed oxide was formed by mixing nickel cobalt lithium manganate (NCM523, nickel:cobalt:manganese=5:2:3, lithium/metal (except lithium) ratio=1.04, a BET specific surface area of 0.67 $m^2/g$) and lithium manganese oxide ($LiMn_2O_4$) at 70:30 (weight ratio). This mixed oxide (MO), CB which has a BET specific surface area of 62 $m^2/g$ together with carbon black powder (GR) which has a BET specific surface area of 22 $m^2/g$ as the conductive agents, and polyvinylidene fluoride (PVDF) as the binder resin were added to N-methylpyrrolidone as a solvent (hereinafter referred to as "NMP") at MO:CB:GR:PVDF=3:3:1:3 in a solid content mass ratio. In addition, anhydrous oxalic acid (molecular weight: 90) as an organic moisture scavenger was added to this mixture by 0.03 parts by mass relative to 100 parts by mass of the solid content of the mixture excluding the NMP. The mixture including anhydrous oxalic acid was planetary mixed and dispersed for 30 minutes to prepare a slurry having these materials dispersed uniformly. The slurry was applied onto a 20-μm-thick aluminum foil as a positive electrode current collector. Next, the electrode was heated for 10 minutes at 125° C., thereby vaporizing NMP. Thus, the positive electrode active material layer was formed. In addition, the positive electrode active material layer was pressed, thereby forming the positive electrode with the positive electrode active material layer applied on one surface of the positive electrode current collector.

Separator

A ceramic separator includes a 5-μm-thick heat-resistant microparticle layer including alumina as a heat-resistant microparticle, and a 25-μm-thick olefin resin layer including polypropylene was used.

Electrolyte Solution

For preparing the nonaqueous electrolyte solution, ethylene carbonate (hereinafter referred to as "EC"), diethyl carbonate (hereinafter referred to as "DEC"), and ethyl methyl carbonate (hereinafter referred to as "EMC") were mixed at a volume ratio of EC:DEC:EMC=30:60:10. To this nonaqueous solvent, lithium hexafluorophosphate ($LiPF_6$) as the electrolyte salt was dissolved at a concentration of 0.9 mol/L. To the obtained electrolyte solution, cyclic disulfonate (methylene methanedisulfonate (MMDS)) as the additive A, vinylene carbonate (VC) as the additive B, and fluoroethylene carbonate (FEC) as the additive C were dissolved in each predetermined proportion. This electrolyte solution containing the additives was used as the electrolyte solution. The compositions of the additives used for the battery in each example assuming that the total amount of the additives is 100% are shown in Table 1.

Manufacture of Lithium Ion Secondary Battery

A rectangle with a predetermined size was cut out of each of the negative electrode and the positive electrode manufactured as above. In a portion thereof on which coating was not applied for connecting the terminal, a positive electrode lead terminal made of aluminum was welded with ultrasonic waves. Similarly, a negative electrode lead terminal made of nickel with the same size as the positive electrode lead terminal was welded with ultrasonic waves to a portion of the negative electrode plate on which coating was not applied. The negative electrode plate and the positive electrode plate were disposed on both surfaces of the 25-μm-thick porous polypropylene separator in a state that the active material layers are stacked with the separator interposed therebetween; thus, the electrode plate stack was obtained. Except one long side of the two aluminum laminate films, the other three sides were attached through heat-sealing. Thus, a bag-shaped package was manufactured. Into the bag-shaped package, the electrode stack was inserted. Next, the electrode stack was vacuum impregnated with the electrolyte solution poured into the package. Then, the opening was heat-sealed under reduced pressure. Thus, a stacked lithium ion battery was obtained. The stacked lithium ion battery was used to perform high-temperature aging a plurality of times and thus a stacked lithium ion battery with a battery capacity of 5 Ah was obtained.

Initial Charging and Discharging

The constant-current constant-voltage charging was performed at a current of 1 C with an upper voltage of 4.15 V under an atmosphere temperature of 55° C. until the residual battery (hereinafter referred to as "SOC", state of charge) became 100% from 0%. Next, the constant-current discharging was performed at a current of 1 C until the SOC became 0%.

Measurement of Residual Amount of Each Additive

The lithium ion secondary battery after the initial charging and discharging was disassembled. The amount of each additive remaining in the electrolyte solution collected from the battery was measured based on nuclear magnetic resonance (NMR).

Content Amount of Sulfur in Electrode

The lithium ion secondary battery after the initial charging and discharging was disassembled. The amount of sulfur contained in each electrode collected from the disassembled battery was measured based on combustion-ion chromatography.

Cycle Characteristic Test

After measuring the amount of the additives remaining in the electrolyte solution, the package containing the battery is sealed again as the same procedure described above. The manufactured battery was subjected to the cycle test under the following condition: the constant-current constant-voltage charging (CCCV charging) at a current of 1 C and a voltage of 4.15 V and the constant-current discharging (CC discharging) at a current of 1 C were repeated for a month at 55° C. between an SOC of 0% and an SOC of 100%. The capacity retention was calculated by a formula: (battery capacity after a month)/(initial battery capacity).

TABLE 1

| | Ratio relative to total molar amount of additives (%) (prepared amount) | | | | Ratio relative to total molar amount of additives (%) (residual amount) | | | | Sulfur contained in positive electrode (μg/cm2) | Sulfur contained in negative electrode (μg/cm2) | Discharge capacity retention (%) |
|---|---|---|---|---|---|---|---|---|---|---|---|
| | Additive A | Additive B | Additive C | Additive B + C | Additive A | Additive B | Additive C | Additive B + C | | | |
| Example 1 | 13.7 | 56.0 | 30.3 | 86.3 | 0.3 | 70.5 | 29.2 | 99.7 | 14 | 15 | 93.0 |
| Example 2 | 13.7 | 56.0 | 30.3 | 86.3 | 0.2 | 73.7 | 26.1 | 99.8 | 15 | 16 | 92.8 |
| Example 3 | 18.8 | 77.0 | 4.2 | 81.2 | 0.2 | 99.8 | 0.0 | 99.8 | 16 | 17 | 94.8 |
| Example 4 | 28.6 | 7.8 | 63.5 | 71.4 | 0.2 | 0.0 | 99.8 | 99.8 | 15 | 16 | 94.2 |
| Example 5 | 33.5 | 36.7 | 29.8 | 66.5 | 0.2 | 62.1 | 37.7 | 99.8 | 17 | 19 | 93.8 |
| Example 6 | 44.3 | 27.7 | 28.1 | 55.7 | 4.4 | 52.8 | 42.8 | 95.6 | 20 | 26 | 93.8 |
| Example 7 | 33.2 | 42.3 | 24.5 | 66.8 | 1.1 | 70.3 | 28.5 | 98.9 | 18 | 20 | 93.6 |
| Example 8 | 36.6 | 37.4 | 26.0 | 63.4 | 12.8 | 56.4 | 30.8 | 87.2 | 21 | 29 | 93.2 |
| Example 9 | 41.4 | 32.3 | 26.2 | 58.6 | 32.3 | 41.9 | 25.8 | 67.7 | 24 | 37 | 93.1 |
| Example 10 | 61.8 | 29.7 | 8.5 | 38.2 | 48.4 | 38.7 | 12.9 | 51.6 | 26 | 45 | 92.8 |
| Comparative Example 1 | 66.9 | 18.3 | 14.8 | 33.1 | 100.0 | 0.0 | 0.0 | 0.0 | 17 | 15 | 76.2 |
| Comparative Example 2 | 80.2 | 11.0 | 8.9 | 19.8 | 100.0 | 0.0 | 0.0 | 0.0 | 22 | 36 | 80.2 |
| Comparative Example 3 | 89.0 | 6.1 | 4.9 | 11.0 | 100.0 | 0.0 | 0.0 | 0.0 | 34 | 59 | 76.5 |
| Comparative Example 4 | 80.2 | 11.0 | 8.9 | 19.8 | 100.0 | 0.0 | 0.0 | 0.0 | 23 | 37 | 84.5 |
| Comparative Example 5 | 77.9 | 12.2 | 9.9 | 22.1 | 100.0 | 0.0 | 0.0 | 0.0 | 20 | 32 | 87.1 |
| Comparative Example 6 | 80.2 | 11.0 | 8.9 | 19.8 | 100.0 | 0.0 | 0.0 | 0.0 | 22 | 43 | 87.0 |
| Comparative Example 7 | 71.4 | 20.3 | 8.3 | 28.6 | 55.6 | 22.2 | 22.2 | 44.4 | 20 | 18 | 82.2 |
| Comparative Example 8 | 75.1 | 18.8 | 6.1 | 24.9 | 58.8 | 23.5 | 17.6 | 41.2 | 28 | 33 | 88.4 |
| Comparative Example 9 | 79.6 | 14.8 | 5.6 | 20.4 | 61.8 | 23.5 | 14.7 | 38.2 | 39 | 62 | 79.7 |
| Comparative Example 10 | 88.8 | 8.1 | 3.1 | 11.2 | 69.5 | 18.3 | 12.2 | 30.5 | 42 | 73 | 78.2 |

In Examples 1 to 10, the molar ratio of MMDS remaining in the electrolyte solution does not exceed 50%. As a result, the discharge capacity retention after the repeated cycle charging and discharging is high. That is to say, the discharge capacity retention is high if the molar ratio of MMDS remaining in the electrolyte solution is smaller than the total of the molar ratio of VC and the molar ratio of FEC. This indicates that the operation of MMDS on the active material of the negative electrode for forming the protective film for the negative electrode provides the high effect of protecting the negative electrode. On the other hand, MMDS attacks nickel cobalt lithium manganate as the positive electrode active material under high temperature. This reduces the reversible lithium in the positive electrode. On this occasion, VC and/or FEC that can protect the positive electrode and the negative electrode evenly can protect the positive electrode from the attack by MMDS under high temperature, which leads to the higher discharge capacity retention. That is to say, when MMDS and VC and/or FEC are left well-balanced in the electrolyte solution in a predetermined amount, the discharge capacity retention can be improved remarkably. For example, if VC and/or FEC exists excessively in the electrolyte solution, a large amount of gas is produced. This leads to a shorter lifetime of the electrode. Moreover, since the weight of sulfur existing in the negative electrode is larger than the weight of sulfur existing in the positive electrode, the sufficient protective film is formed for the negative electrode. This further increases the effect of protecting the negative electrode, thereby improving the discharge capacity retention.

Examples of the embodiment have been described so far but Examples merely represent some examples of the embodiment of the present disclosure. The description of Examples made above is not intended to limit the technical range according to the present disclosure to the particular embodiment or specific structure. The lithium ion secondary battery according to the embodiment of the present disclosure may be any of the following first to eighth lithium ion secondary batteries.

The first lithium ion secondary battery is a lithium ion secondary battery having a power generation element in a package, the power generation element including: a positive electrode having a positive electrode active material layer disposed on a positive electrode current collector, a negative electrode having a negative electrode active material layer disposed on a negative electrode current collector, a separator, and an electrolyte solution, in which: the electrolyte solution includes an additive A containing sulfur, a cyclic carbonate additive B which is different from the additive A and which has an unsaturated bond, and/or a cyclic carbonate additive C which is different from the additives A and B and which has a halogen; and the molar ratio of the additive A assuming that the total molar amount of the additive A, the additive B, and the additive C is 100 is smaller than the molar ratio of the additive B, the molar ratio of the additive C, or the total molar ratio of the additive B and the additive C.

The second lithium ion secondary battery is the first lithium ion secondary battery, in which the molar ratio of the additive A is 50 mol % or less.

The third lithium ion secondary battery is the first or second lithium ion secondary battery, in which both the additive B and the additive C are included.

The fourth lithium ion secondary battery is any of the first to third lithium ion secondary batteries, in which the additive A is selected from cyclic disulfonic acid ester compounds.

The fifth lithium ion secondary battery is any of the first to fourth lithium ion secondary batteries, in which the additive B is vinylene carbonate.

The sixth lithium ion secondary battery is any of the first to fifth lithium ion secondary batteries, in which the additive C is 4-fluoroethylene carbonate.

The seventh lithium ion secondary battery is any of the first to sixth lithium ion secondary batteries, in which a positive electrode active material layer includes a transition metal composite oxide represented by general formula $Li_xNi_yCo_zMe_{(1-y-z)}O_2$ (where Me is at least one kind of metal selected from the group consisting of Al, Mn, Na, Fe, Cr, Cu, Zn, Ca, K, Mg, and Pb).

The eighth lithium ion secondary battery is any of the first to seventh lithium ion secondary batteries, in which the weight of sulfur existing in the negative electrode is larger than the weight of sulfur existing in the positive electrode.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
   a positive electrode, comprising a positive electrode active material comprising nickel;
   a negative electrode comprising a negative electrode active material layer comprising a negative electrode active material disposed on a negative electrode current collector, wherein the negative electrode active material comprises a mixture of graphite particles and amorphous carbon particles;
   a separator; and
   an electrolyte solution, the electrolyte solution including an additive A containing sulfur, and at least one of a cyclic carbonate additive B which is different from the additive A and which has an unsaturated bond and a cyclic carbonate additive C which is different from the additives A and B and which has a halogen,
   wherein a molar ratio of the additive A relative to a total molar amount of the additive A, the additive B, and the additive C is smaller than a total of a molar ratio of the additive B and a molar ratio of the additive C relative to the total molar amount,
   wherein the additive A is a cyclic disulfonic acid ester compound, and
   wherein the molar ratio of additive A to the total molar amount of additive A, additive B, and additive C is between 18.8 to 44.3%.

2. The lithium ion secondary battery according to claim 1, wherein both the additive B and the additive C are included.

3. The lithium ion secondary battery according to claim 1, wherein the cyclic disulfonic acid ester compound is selected from the group consisting of methylene methanedisulfonate (MMDS), ethylene methanedisulfonate, and propylene methanedisulfonate.

4. The lithium ion secondary battery according to claim 1, wherein the additive B is vinylene carbonate.

5. The lithium ion secondary battery according to claim 1, wherein the additive C is 4-fluoroethylene carbonate.

6. The lithium ion secondary battery according to claim 1, wherein a positive electrode active material layer includes a transition metal composite oxide represented by general formula $Li_x Ni_y Co_z Me_{(1-y-z)}O_2$, wherein Me is at least one kind of metal selected from the group consisting of Al, Mn, Na, Fe, Cr, Cu, Zn, Ca, K, Mg, and Pb, "x" is a numeral satisfying $1 \le x \le 1.2$, "y" and "z" are positive numerals satisfying $y+z<1$, and "y" is a numeral of 0.5 or less.

7. The lithium ion secondary battery according to claim 6, wherein $y > 1-y-z$ and $y>z$.

8. The lithium ion secondary battery according to claim 1, wherein a weight of sulfur existing in the negative electrode is larger than a weight of sulfur existing in the positive electrode.

9. The lithium ion secondary battery according to claim 1, wherein the separator comprises an olefin resin layer and a heat resistant microparticle layer.

10. The lithium ion secondary battery according to claim 1, wherein the mixture contacts the electrolyte solution.

11. The lithium ion secondary battery according to claim 1, wherein after the lithium ion secondary battery undergoes one charge and discharge cycle, the molar ratio of additive A to the total molar amount of additive A, additive B, and additive C is between 0.2 to 4.4%.

12. The lithium ion secondary battery according to claim 1, wherein the electrolyte solution is a nonaqueous electrolyte solution.

13. The lithium ion secondary battery according to claim 12, wherein the electrolyte solution comprises a linear carbonate and a cyclic carbonate.

14. The lithium ion secondary battery according to claim 13, wherein the linear carbonate is dimethyl carbonate, diethyl carbonate, di-n-propyl carbonate, di-i-propyl carbonate, di-n-butyl carbonate, di-isobutyl carbonate, or di-t-butyl carbonate.

15. The lithium ion secondary battery according to claim 13, wherein the cyclic carbonate is propylene carbonate or ethylene carbonate.

* * * * *